Figure 1:
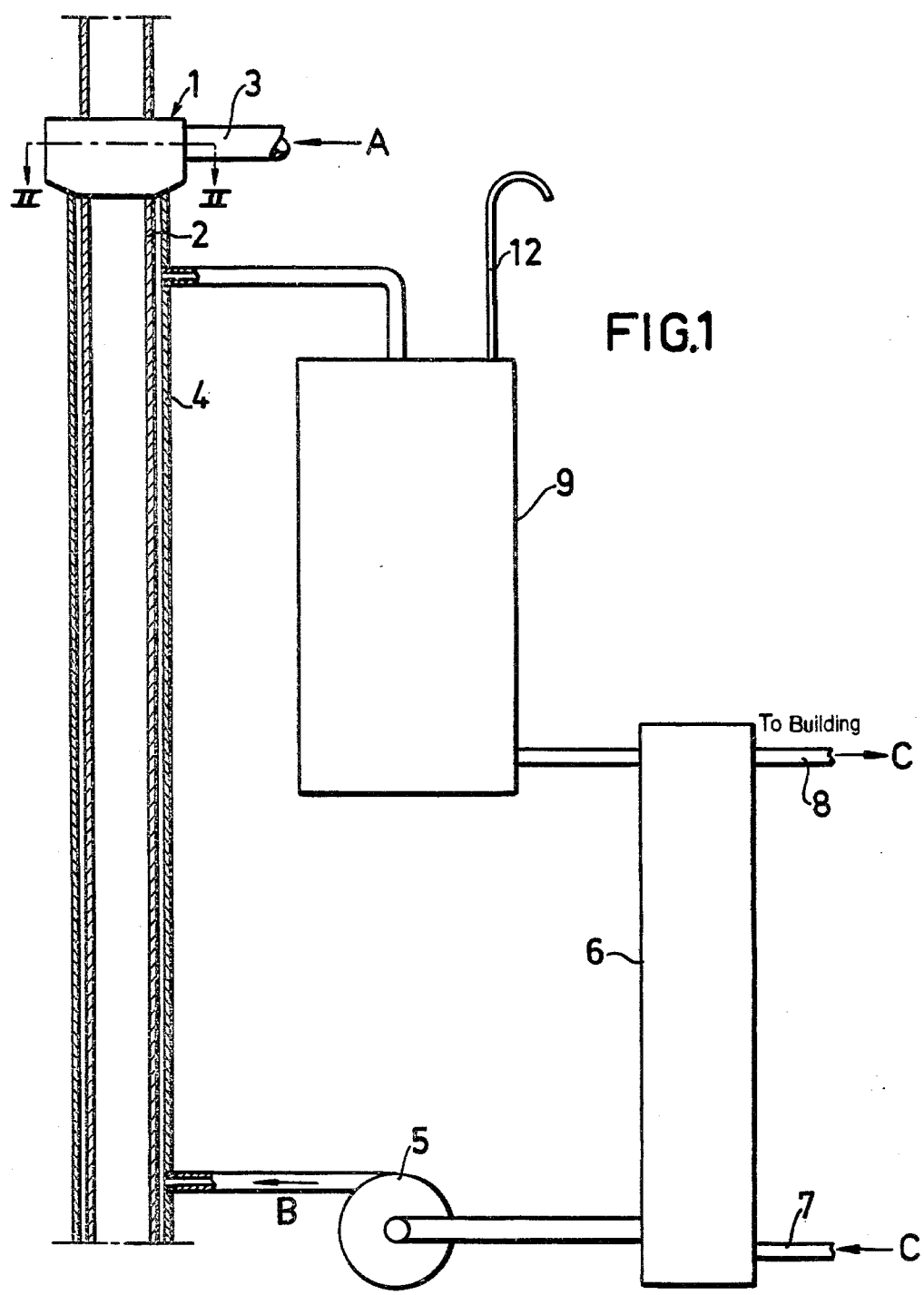

United States Patent [19]

Jönsson

[11] 4,352,391
[45] Oct. 5, 1982

[54] METHOD AND APPARATUS FOR RECOVERING HEAT IN WASTE WATER

[75] Inventor: Kurt A. Jönsson, Nynäshamn, Sweden

[73] Assignee: Rederiaktiebolaget Nordstjernan, Stockholm, Sweden

[21] Appl. No.: 167,190

[22] Filed: Jul. 8, 1980

[51] Int. Cl.³ .......................... F24H 3/00; F28F 9/02
[52] U.S. Cl. ......................................... 165/1; 165/47; 165/174; 237/56
[58] Field of Search ............... 165/DIG. 2, DIG. 12, 165/47, 154, 174, 39, 1, 109 T; 122/20 B; 237/8 R, 56

[56] References Cited

U.S. PATENT DOCUMENTS

| 2,016,341 | 10/1935 | Nelson | 165/174 |
| 2,097,104 | 10/1937 | Saha | 165/174 |
| 4,157,706 | 6/1979 | Gaskill | 122/20 B |
| 4,256,170 | 3/1981 | Crump | 165/1 |
| 4,256,176 | 3/1981 | Cohen | 165/76 |
| 4,304,292 | 12/1981 | Cardone et al. | 165/1 |

FOREIGN PATENT DOCUMENTS

| 2304537 | 8/1974 | Fed. Rep. of Germany | 165/DIG. 12 |
| 2806029 | 8/1979 | Fed. Rep. of Germany | 165/DIG. 12 |
| 2905251 | 6/1979 | Fed. Rep. of Germany | 62/238.6 |
| 2312735 | 12/1976 | France | 62/238.6 |

Primary Examiner—Albert W. Davis
Assistant Examiner—Margaret A. Focarino
Attorney, Agent, or Firm—Pollock, Vande Sande & Priddy

[57] ABSTRACT

The invention relates to a heat transfer from waste water from a building back to the building. The waste water is supplied to a waste pipe (2) in such a way that it is forced to flow downwardly in the pipe along its inner wall. Heat from the waste water is transmitted to a medium flowing on the outside of the pipe.

5 Claims, 2 Drawing Figures

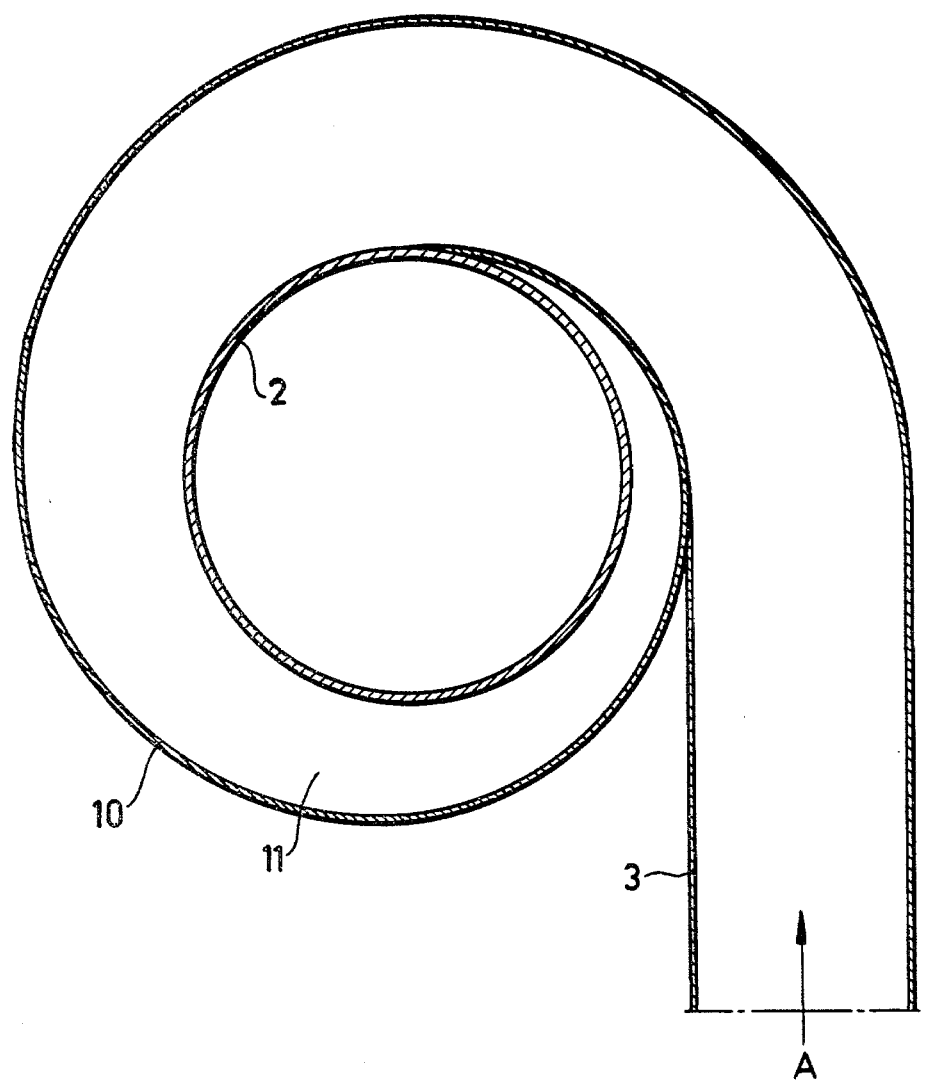

METHOD AND APPARATUS FOR RECOVERING HEAT IN WASTE WATER

The present invention relates to a method of recovering heat in waste water from a building during its flow downwardly in a waste pipe in order to obtain a heat transfer from the waste water back to the building. The invention also relates to an apparatus for carrying out the method.

Systems for recovering waste water heat from factories and other buildings are previously known. Usually, the waste water is supplied to a tank for holding the waste water therein and heat is for instance transmitted to fresh water by heat exchange, for instance, by means of a heat pump. If the waste water contains a solid substance, such a tank for holding the waste water is inappropriate due to the possibility of deposits on the bottom of the tank.

As distinguished from said systems using a tank for the waste water, the present invention is characterized in that the waste water is guidedly supplied to the waste water pipe for controlled flow along the inner wall of side pipe for emitting heat during this flow to medium flowing on the outside of the waste water pipe.

The present invention provides a simple but yet comparatively highly efficient heat transfer from waste water from a building back to the building. Moreover, the invention can easily be applied to an existing waste water system.

A preferred embodiment of the invention will now be described with reference to the accompanying drawings, in which FIG. 1 is a schematic view of an apparatus according to the invention, and FIG. 2 is a sectional view taken along the line II—II of FIG. 1 and shows in larger scale a guiding device for supplying waste water to a waste water pipe.

FIG. 1 shows a guiding device 1 for incoming waste water to a vertically positioned waste water pipe 2. Arrow A illustrates the supply of the waste water to the guiding device 1 through a pipe 3. The waste water pipe 2 can be provided along its length with several spaced apart inlets having such guiding devices, although only one such inlet is shown on the drawings. The waste water pipe 2 is along a certain length thereof mantled so that a space 4 for a medium is formed such that the medium completely surrounds the waste water pipe along this length. When heat exchange from the waste water in the pipe 2 to the medium in the space 4 is to take place, it is essential that the supply of the waste water takes place in such a way, that the waste water to the utmost possible extent follows the inner wall of the pipe 2 well in contact with the inner wall. This can be obtained in different ways. In the preferred embodiment shown in FIGS. 1 and 2 the guiding device 1 consists of a chute which helically supplies the waste water to the pipe 2.

Moreover, in the embodiment shown, the medium in space 4 is intended to emit heat to fresh water entering the building. For reasons of security, it is appropriate that this heat transmitting medium be water although other fluids can be used. The fresh water can be arranged to surround the space 4, but in the embodiment as shown, the heat transmitting medium is circulated in a circuit by means of a pump 5. The circuit includes a heat exchanger 6 for transferring heat from the heat transmitting medium in space 4 to the fresh water. As shown by arrows B and C, the heat exchange from the heat transmitting medium to the fresh water preferably takes place in a counter-current flow. In FIG. 1 inlet 7 and outlet 8 for the fresh water to heat exchanger 6 are shown. The circuit also includes a buffer tank 9 for the circulating heat transmitting medium. Buffering of the heat transmitting medium makes it possible to transfer heat to the fresh water at the time when the fresh water is consumed. Tapping of waste water in a building does not, most of the time, occur simultaneously with the consumption of fresh water.

FIG. 2 shows more in detail the construction of the guiding device 1 for the supply of waste water to the pipe 2. Arrow A shows the supply of the waste water to the guiding device through the pipe 3. The outer wall 10 of the guiding device is helically arranged into the waste water pipe 2 and its bottom 11 is preferably inclined towards the pipe. The inclination is arranged relative to the supply speed of the waste water so that the water, due to centrifugal force, is spread over the whole width of the chute. It has been proved appropriate to have the spread of the waste water occur during a part of a revolution, preferably three quarters of a revolution, before the spiral opens towards the waste water pipe 2. In this way the motional dynamic required for the waste water to follow the inner wall of the waste water pipe 2 along a substantial part of the circumference is secured. As is mentioned above, this even spreading of the waste water along the pipe wall is of great importance for an economic heat exchange.

Should the waste water pipe receive cold water, the heat transmitting medium in space 4 could get cooled. In order to avoid the effect of such a cooling becoming too high, it is preferred that the circulation of the heat transmitting medium in such cases be halted. This can be arranged by controlling the operation of the circulation pump 5 on the basis of the difference between the temperature of the incoming waste water and the heat transmitting medium. If this temperature difference becomes negative, the circulation pump 5 is stopped, and it is started again when the temperature difference becomes positive. An automatic thermostatic control having such an effect can easily be provided according to known techniques. Such regulation of the operation of the circulation pump 5 also decreases electricity consumption. If all the fresh water entering the building is guided through the heat exchanger 6, it should, however, very seldom occur that the temperature of the waste water is below the temperature of the heat transmitting medium.

In many cases, it could be appropriate to arrange two or more complete apparatuses according to the invention after each other along one and the same waste water pipe. The heat exchangers 6 for the fresh water are in such an arrangement preferably connected in series and in counter-current. It is furthermore not necessary, that, as shown in the drawings, the waste water pipe be precisely vertically positioned. A certain inclination can be accepted within the scope of the invention.

With an apparatus according to the invention the recovering of considerable heat quantities from waste water from buildings is possible. As described above, this heat transfer takes place in a way to ensure safety against mixing of waste water in the fresh water system. A small overpressure exists in the circulating heat transmitting medium in space 4. If an aperture should occur in the wall between this medium and the sewer connected to waste water pipe 2, the heat transmitting medium flows out of space 4 into pipe 2 and into the sewer. The fresh water is under overpressure in the system and therefore a rupture in the fresh water heat exchanger 6 results in fresh water flowing out into the circuit for the heat transmitting medium and can from this circuit be discharged through an appropriately positioned overflow pipe 12.

Due to the low pressure in the circulating circuit, the waste pipe can be made of a thin plate in spite of the fact that it is subjected to outer overpressure. This pipe can preferably be made of stainless steel or copper.

Calculations and measurements have proved, that an apparatus according to the invention and applied to a vertical waste pipe from a building has an efficiency of 40–50% during discontinuous tapping of hot-water into the waste pipe. The efficiency is here defined as obtained heat quantity in relation to the heat quantity required for heating incoming fresh water to the temperature of the waste water.

As mentioned above, fresh water can in an alternative embodiment be arranged to surround the space 4. In other alternative embodiments, a medium directly utilized for heating purposes can be arranged to flow in the space 4, and without heat exchange can be supplied to the heating system of the building. This can be arranged in such a manner that a heat compressor (heat pump) transmits heat from the medium.

I claim:

1. A method of recovering heat from waste water from a building as it flow downwardly through a substantially vertically oriented waste pipe, comprising supplying a flowing medium to an inlet communicating with the outside of said waste water pipe, supplying incoming waste water to the interior of said pipe at a location in said pipe which is elevated relative to the location of said inlet of said flowing medium, said waste water supplying step including the step of forcing the incoming waste water toward the inner wall of said pipe for flow along a substantial circumferential portion of said inner wall to increase the transfer of heat from said incoming waste water through the wall of said pipe to the flowing medium outside of said pipe as said waste water flows downwardly along the inner wall of said pipe past said medium.

2. The method of claim 1 wherein said waste water supplying step causes the waste water to flow around a portion of the exterior of said pipe, in a direction transverse to the direction of elongation of said pipe, prior to entry of said incoming waste water to the interior of said pipe.

3. The method of claim 2 wherein said flowing medium flows in an upward direction along the outside of said pipe as said waste water flows downwardly along the inner wall of said pipe.

4. An apparatus for recovering heat in waste water from a building during its flow downwardly in a waste pipe, comprising a generally vertically oriented waste pipe, at least one branch pipe laterally connected to said waste pipe for the supply of incoming waste water to said pipe, a guiding device located at the connection between said branch pipe and said waste pipe, said guiding device being provided with a surface inclined downwardly towards the waste pipe for guiding the incoming waste water into the waste pipe and forcing it to flow along a substantial portion of the circumference of the inner wall of said waste pipe, means defining a space positioned outside of said waste pipe downwardly of said guiding device for the reception of a circulating medium, means for circulating said medium through said space, and means for transmitting heat from said medium to the building.

5. The apparatus of claim 4 wherein said means for circulating said medium includes means defining a buffering space for said medium.

* * * * *